United States Patent [19]

Ko et al.

[11] 4,041,507
[45] Aug. 9, 1977

[54] CAMERA FOR UNDERWATER AND ABOVE WATER USE

[75] Inventors: Norman Wah Man Ko; chan Kwok Yan, both of North Point, Hong Kong

[73] Assignee: W. Haking Industries, Ltd., Hong Kong, Hong Kong

[21] Appl. No.: 592,634

[22] Filed: July 2, 1975

[51] Int. Cl.² ............................................. G03b 17/08
[52] U.S. Cl. ........................................ 354/64; 354/288
[58] Field of Search ................... 354/64, 288; 352/242

[56] References Cited

U.S. PATENT DOCUMENTS

| | | | |
|---|---|---|---|
| 2,487,868 | 11/1949 | Grigsby | 354/64 |
| 2,573,885 | 11/1951 | Whitman et al. | 354/64 |
| 2,865,271 | 12/1958 | Klein | 354/64 |
| 2,944,474 | 7/1960 | Dennis | 354/64 |
| 3,019,715 | 2/1962 | Arnold et al. | 354/64 |
| 3,073,227 | 1/1963 | Weiss | 354/64 |
| 3,162,106 | 12/1964 | D'Oplinter | 354/64 |
| 3,412,661 | 11/1968 | Soumar | 354/64 |
| 3,832,725 | 8/1974 | Cook | 354/64 |

FOREIGN PATENT DOCUMENTS 179,967   10/1954   Austria .................................. 354/64

Primary Examiner—L. T. Hix
Assistant Examiner—Alan Mathews
Attorney, Agent, or Firm—Wallenstein, Spangenberg, Hattis & Strampel

[57] ABSTRACT

A preferably pocket-sized camera adapted for underwater as well as above water use, comprises a one-piece outer housing formed of a transparent synthetic plastic material having most areas thereof coated with an opaque material except for areas forming objective lens and viewfinder window means, and, when used, electronic flash light diffusing window means, to eliminate the need for waterproofing these areas of the camera. The housing has an opening at the rear thereof providing an entry into a compartment for receiving a camera mechanism support frame on which are mounted substantially all of the functional components of the camera. Openings formed in the housing receive in watertight relation shutter, film advancing means, and, when used, electronic flash setting means. A closure member, having means thereon which cooperates with releasable closure sealing and locking means on the main housing, is provided for the opening in the rear of the housng.

13 Claims, 9 Drawing Figures

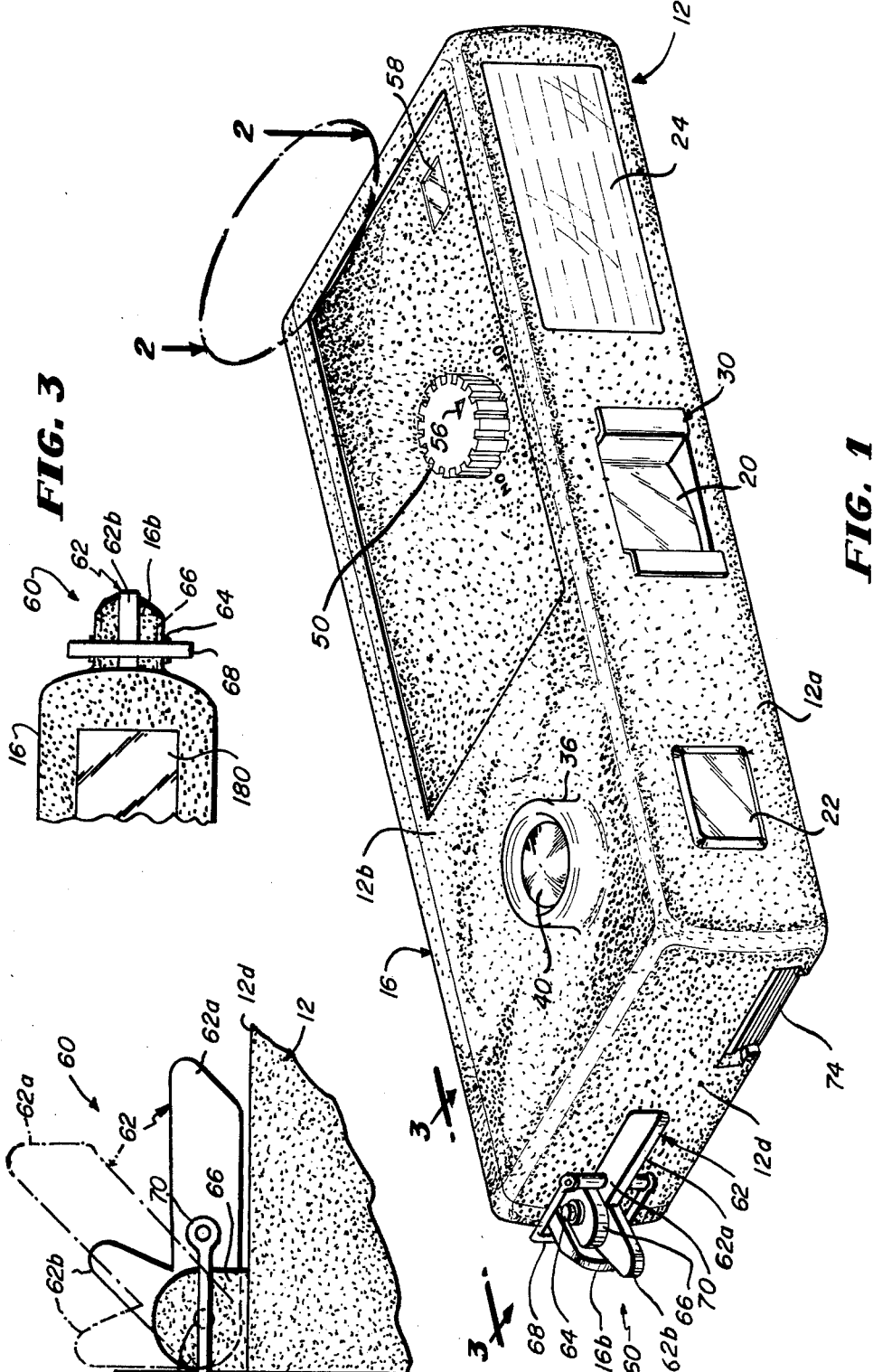

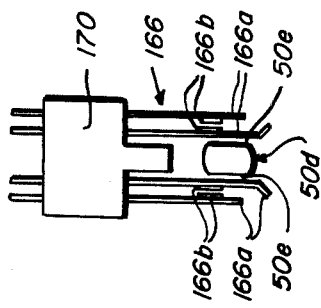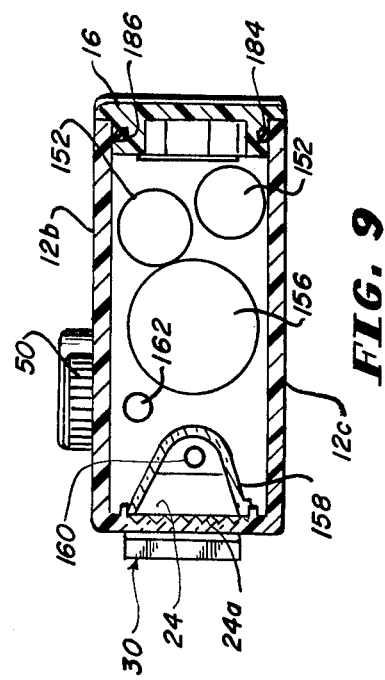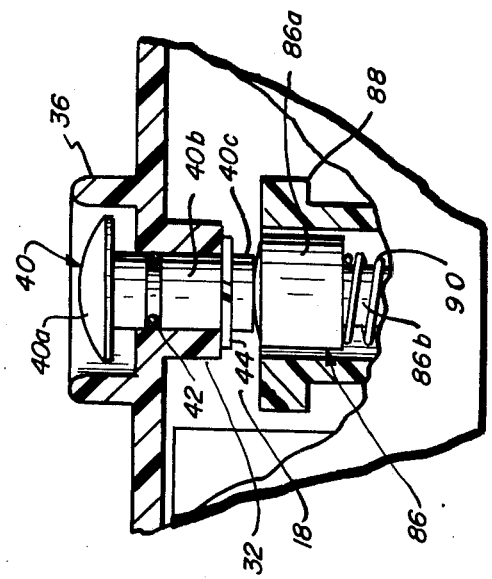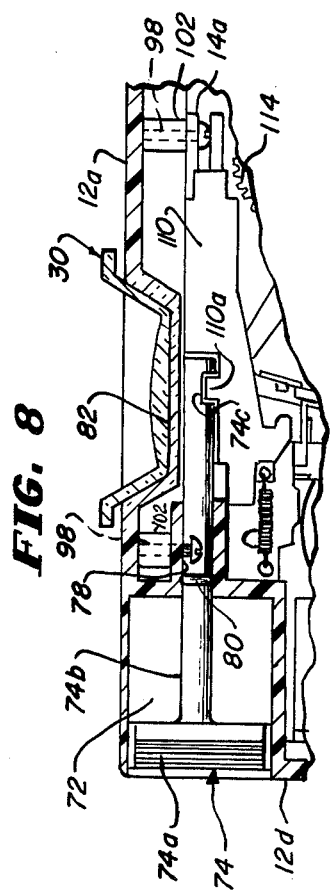

CAMERA FOR UNDERWATER AND ABOVE WATER USE

BACKGROUND OF INVENTION

The present invention relates to a camera adapted for underwater as well as above water use, and which, in a preferred embodiment, is of a size such that it can be carried in the user's shirt pocket.

Cameras adapted for underwater use heretofore have taken various forms. Generally speaking, such cameras comprise a waterproof housing in which a conventional camera is rigidly secured. Exemplary of cameras of this type are those disclosed in U.S. Pat. Nos. 2,573,885, 2,944,474, and 3,412,661. In the case of the first two of the above-mentioned patents, the outer, waterproof housing for the camera is formed from an opaque material. In at least one of the walls of the outer housing, an opening is provided therethrough for receiving a separate relatively large window-forming member made of glass or other transparent material through which picture-forming light rays are admitted to the objective lens of the conventional camera secured inside of the outer housing. Sealing means must be employed to provide a water-tight seal between the window-forming member and the opening in the housing in which it is positioned. In the case of the underwater camera shown in U.S. Pat. No. 3,412,661, the entire outer housing is formed from a transparent material. One wall of the housing acts as a window for admitting picture-forming light rays to the objective lens of the conventional camera encased in the housing. Underwater cameras exemplified by those shown in the aforementioned patents, apart from their bulk and concomitant cumbersomeness, also have the important disadvantage of requiring the user to remove not only one wall of the outer, waterproof housing to reach the conventional camera secured on the inside of the outer housing, but also, require the user to open the housing of the conventional camera encased in the outer housing before film can be removed from, or reloaded in, the camera.

A variaton of the cameras disclosed in the aforementioned three U.S. patents is shown in U.S. Pat. No. 3,162,106. The camera of that patent differs from the cameras disclosed in the three previously discussed patents in that the outer, waterproof housing, in which a conventional camera is secured, is eliminated. Instead, the camera of U.S. Pat. No. 3,162,106 comprises a one-piece housing having an opening through the front wall thereof for receiving a separate objective lens. The inner end of the objective lens is adapted to engage an opening provided in a support member for the camera mechanism. The camera of U.S. Pat. No. 3,162,106 has the significant disadvantage of requiring the user to remove both the objective lens and the entire camera mechanism from the housing before film can be removed from, or reloaded in, the camera. This requirement, of course, not only makes the camera inconvenient to use, but, also, requires the utmost care on the part of the user to assure that the separate objective lens is engaged in watertight relationship with the camera housing.

SUMMARY OF THE INVENTION

In accordance with the present invention, a camera, adapted for underwater as well as above water use, is provided which is a functional unit in itself and does not require an outer, or second, waterproof housing. The housing of the camera has objective lens and viewfinder window means formed therein as an integral part of the housing. Thus, special openings in the housing for receiving a separate objective lens window, or, as in the case of the camera shown in the aforementioned U.S. Pat. No. 3,162,106, a separate objective lens, and the need for waterproofing the separate window or lens, are eliminated. This feature of the camera represents an important savings in material and labor costs over conventional waterproof cameras of the type described hereinabove. Substantially the complete mechanism of the camera, including, in a preferred embodiment, an electronic flash light assembly, is mounted on a support frame which is easily slidable into the housing wherein it can be secured readily with standard fastening means and tools. The camera is adapted to receive a conventional film cartridge which can be inserted into the camera by simply removing a closure member which is releasably locked in watertight and dustproof engagement with the camera housing. Removal of the exposed cartridge, and reloading of the camera with another film cartridge are thus achieved in much the same manner as with conventional cameras restricted to only above water use. The unique structural features of the camera, moreover, make it readily possible to construct it with a pocket-sized compactness, which sharply distinguishes it from the cumbersomeness and unwieldiness which characterizes conventional waterproof cameras.

Briefly, the camera of the present invention comprises a main housing which defines a compartment having an opening for insertion of a camera mechanism sub-housing or support frame. The main housing in the preferred form of the invention advantageously is a unitary, one-piece body formed of a transparent, water-impermeable material such as a clear synthetic plastic. In such case, the main housing is preferably provided only with an opening in the rear thereof through which film is removed from, and loaded into, the camera mechanism sub-housing, and openings for controls by means of which the camera mechanism is operated. The main housing, except in selected areas thereof which remain clear or transparent to serve as objective lens and viewfinder window means, is coated or plated to make it opaque or non-light transmitting. As indicated, since the various window means are an integral part of the main housing, the necessity for waterproofing these areas of the main housing is completely eliminated. As an added feature, the main housing can be formed to enable a detachable close-up lens to be secured thereto at the objective lens window means thereof.

A sub-housing or support frame for the camera mechanism, like the main housing, most advantageously is formed as a unitary or one-piece body from a synthetic plastic material and which when all of the camera mechanism is mounted thereon is inserted into the main housing through the film-receiving opening thereof. In the most preferred form of the invention, openings or spaces are provided in the support frame for enabling camera mechanism controls carried thereon to be automatically positioned in operative relationship with respect to control actuating means mounted in sealed relation in openings formed in the main housing when the support frame is fully inserted into the main housing. This feature further reduces assembly costs. A removable closure member or cover is provided for the support frame and film-receiving opening of the main housing. Sealing means carried by the cover provides a watertight and dustproof seal between the closure member and the main housing. The closure member, like the main housing, may also be formed in one piece from a transparent synthetic plastic material coated with an opaque material with selected areas left uncoated to provide windows for the viewfinder means and for viewing the film frame indicating number in the film. Releasable fastening means are provided on the main housing for holding the closure member in locked watertight and dustproof relation on the main housing. The camera, as stated, in its preferred form, has a horizontally elongated, vertically thin configuration which imparts to it a pocket-sized compactness enabling it to be easily carried in a shirt pocket, or the like, of a user.

It is also a preferred feature of the invention to incorporate an electronic flash apparatus in the support frame which includes a flash-producing element opposite a window integrally formed in the main housing. A flash setting contact is provided in sealed relation in an opening in the main housing.

The above and other features and advantages of the invention will become apparent upon making reference to the specification to follow, the claims and the accompanying drawings wherein:

DESCRIPTION OF DRAWINGS

FIG. 1 is a view in perspective of an embodiment of the camera of this invention;

FIG. 2. is a fragmentary view in elevation illustrating the releasable locking means provided on the main housing of the camera for holding the cover in watertight and dustproof locked relationship on the main housing;

FIG. 3 is a fragmentary view corresponding to the view of FIG. 2 as viewed from the back of the camera;

FIG. 6 is an enlarged fragmentary sectional view showing the shutter actuating controls of the camera;

FIG. 7 is a fragmentary top plan view partly in section showing the operation switch for the electronic flash light assembly;

FIG. 8 is a fragmentary view partly in section showing the film advancing arm in its operative position with respect to the camera mechanism mounted on the support frame, in addition to the detachable close-up lens mounted in front of the objective lens window of the main housing; and FIG. 9 is an end view partly in section showing in somewhat schematic form the components of the electronic flash light assembly of the camera.

DESCRIPTION OF EXEMPLARY EMBODIMENT OF INVENTION

Figure 4:
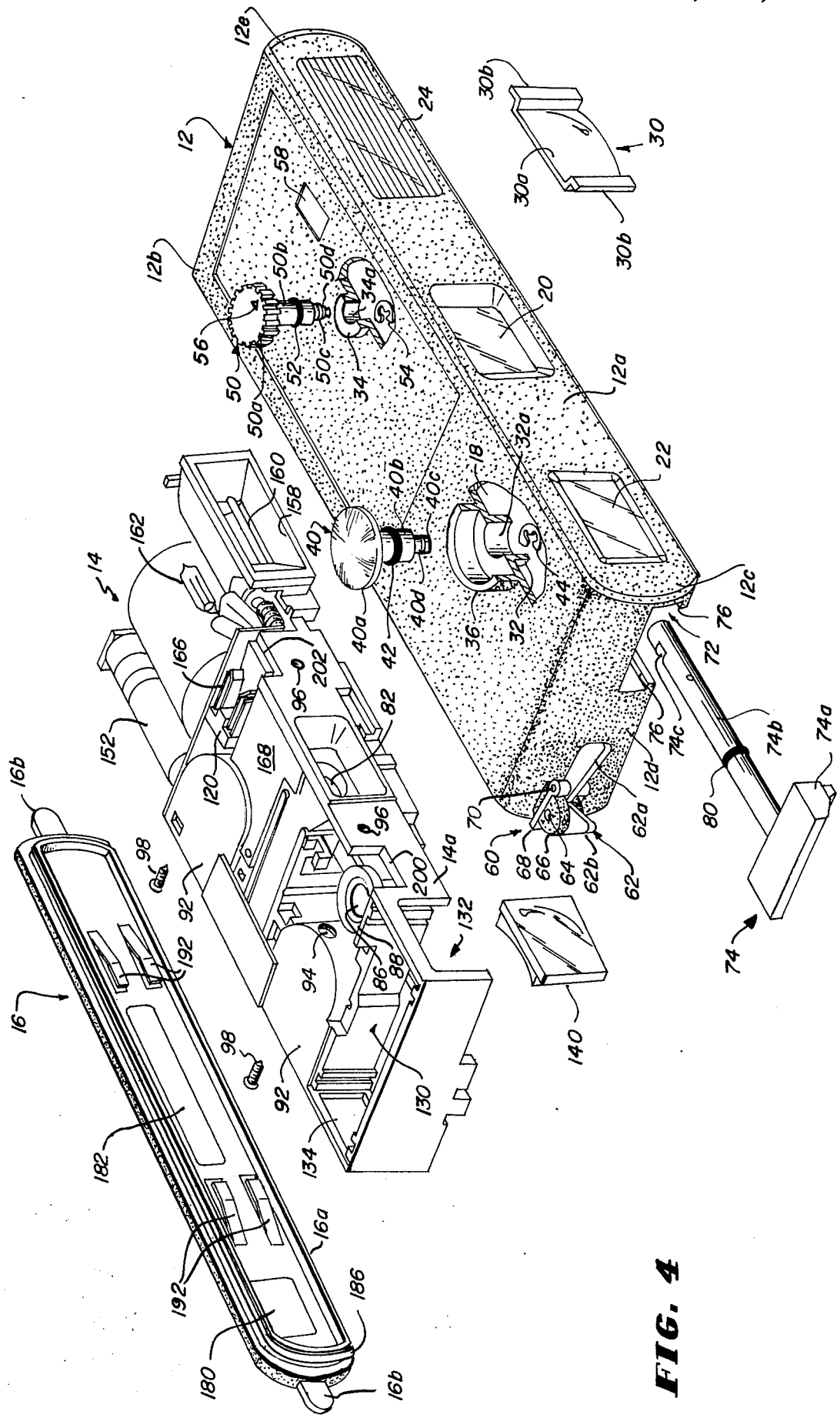
FIG. 4 is an exploded view of the camera shown in FIG. 1 in its disassembled state.
Figure 5:
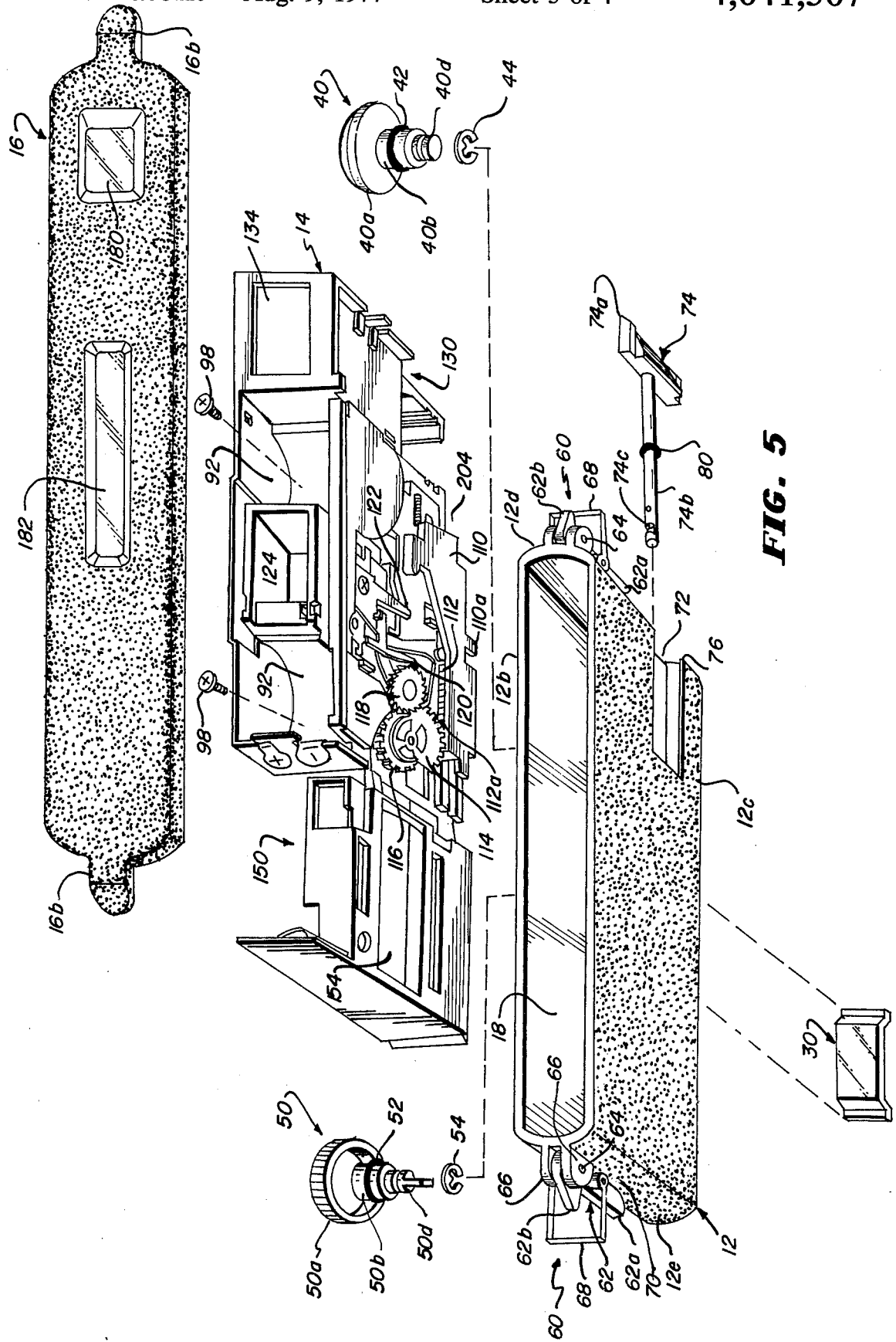
FIG. 5 is an exploded view with the components of the camera shown in reverse order to that illustrated in FIG. 4.

Referring, now, in particular, to FIGS. 4 and 5 of the drawings, the embodiment of the invention illustrated comprises a main housing 12, a camera mechanism sub-housing or support frame 14, and a closure member or cover 16. As indicated, each of the principal components, that is, the housing 12, the support frame 14, and the cover 16 advantageously are of unitary, or one-piece construction, and are formed from a synthetic plastic material. While each of the components can be formed from the same plastic material, the main housing 12 and the cover 16 most advantageously are formed from a transparent synthetic plastic material so that selected areas thereof may remain clear while other areas thereof are coated or plated to render them opaque, or non-light transmitting. As indicated hereinabove, in the preferred embodiment of the camera, the dimensions and configuration of the main housing, the support frame and the cover are such as to impart a horizontally elongated, vertically thin, compact profile to the camera which will enable it to be easily carried in the user's shirt pocket or handbag.

The main housing comprises a front wall 12a, a top wall 12b, a bottom wall 12c, and end walls 12d and 12e. The rear of the main housing is open to provide an entry into a chamber 18 defined by the walls of the main housing. The front wall 12a of the main housing 12 as illustrated has selected areas thereof which are clear to provide an objective lens window 20, a viewfinder window 22, and a flash diffuser window 24. The objective lens window 20 is recessed, and has inwardly converging side walls adapted to receive in snug engagement a detachable close-up lens 30. The close-up lens 30 has a central, convex, photographic light admitting portion 30a to each end of which is joined an outwardly and laterally extending L-shaped gripping portion 30b to facilitate attachment and detachment of the lens 30 on the main housing. The flash diffuser window 24 is formed with a plurality of longitudinal, inwardly extending, parallel ridges 24a which serve to more effectively diffuse the light emitted by the flash light means of the camera.

The top wall 12b of the main housing 12 is formed with a cylindrical, inwardly extending portion 32 having a bore 32a therethrough, and a cylindrical upwardly extending portion 34 having a bore 34a therethrough. As shown, the bore 32a is ringed by an upwardly extending, annular portion 36 which serves as a well for a shutter release control button 40. The button 40 has a head portion 40a joined to shaft 40b having an annular groove or recess formed therein for receiving an "O" ring. The lower end 40c of the shaft 40b is reduced, and is provided with an annular groove or recess 40d for receiving a spring clip 44. The bore 34a in the top wall 12b of the main housing 12 is adapted to receive an electronic flash light control knob 50. The knob 50 has a circumferentially ridged head portion 50a which is joined at its base to a shaft 50b. The shaft 50b has an annular groove or recess formed therein for receiving an "O" ring 52. The lower end 50c of the shaft 50b is reduced, and is provided with an annular groove or recess 50d for engaging a spring clip 54. As best shown in FIG. 1 of the drawings, the upper surface of the head portion 50a of the control knob 50 has an arrowheaded shaped marking 56 thereon for indicating the "on" and "off" position of the knob 50. A window 58, which comprises a clear area in the top wall 12b of the main housing 12, enables a user to view an electronic indicator mounted on the sub-housing or support frame 14.

The end walls 12d and 12e of the main housing 12 each has a releasable locking unit 60 positioned thereon adjacent to the rear of the main housing 12. Each unit 60 comprises a lever 62 which is pivotally mounted by means of a pin 64 between a pair of spaced, outwardly extending ears 66—66 formed on the main housing 12. The lever 62 comprises a handle portion 62a and a cover release portion 62b. A U-shaped locking member 68 is pivotally mounted by means of a pin 70 on the handle portion 62a of the lever 62 adjacent to the ears 66—66. The operation of the lever 62 and the locking member 68 will become clear as the description proceeds.

As best illustrated in FIGS. 5 and 8 of the drawings, the end wall 12d and the bottom wall 12c of the main housing 12 are formed to provide an opening 72 for a film advancing control arm 74. The bottom wall 12c extends inwardly a short distance along each side of the opening 72 to provide a pair of guide rails 76—76 for the handle portion 74a of the film advancing control arm 74. At the inner end of the opening 72, the main housing 12 forms an elongated channel 78 through which the shaft 74b of the film advancing control arm 74 extends. The shaft 74b has an annular groove or recess which retains an "O" ring 80. The "O" ring 80 provides a watertight seal between the shaft 74b and the walls of the channel 78. A recess or notch 74c is provided at the distal end of the shaft 74b for engaging an extension on the film advancing means mounted on the support frame 14 of the camera.

The support frame 14, as indicated, is adapted to have mounted thereon substantially the entire camera mechanism, including an electronic flash light assembly. As viewed in FIGS. 4 and 5 of the drawings, the support frame 14 is formed to receive an objective lens 82, and a shutter release control member which, as shown in more detail in FIG. 6, is in the form of a depressible plunger 86 positioned in a cylinder 88 which is integrally joined to support frame 14. The head 86a of the plunger 86 is maintained in engagement with the lower end 40c of the shaft 40b of the shutter release control button 40 by a compression spring 90 which receives the shaft 86b of the plunger 86. A downward force exerted on the button 40 is transmitted to the plunger 86 which is operatively connected to the shutter release mechanism (not shown) of the camera.

The support frame 14 also has compartments 92—92 formed therein for receiving a film cartridge (not shown). The end wall of each compartment 92—92 is provided with a hole 94 which is aligned with a hole 96 in the front wall 14a of the support frame 14. The holes 94—94 are of a size to enable fastening means such as screws 98—98, as well as the shaft of a screwdriver, to pass therethrough. The screws 98—98, as shown in FIG. 8, are then secured in position, through the holes 96—96 in the front wall 14a, in tapped posts 102—102 joined to the inner surface of the front wall 12a of the main housing 12.

As best shown in FIG. 5 of the drawings, the camera mechanism mounted on the support frame 14 comprises a film advancing member 110 having an extension 110a thereon adapted to be engaged in the recess or notch 74c formed in the lower end of the shaft 74b of the film advancing control arm 74. Joined to the member 110 is a rack 112 having a plurality of teeth 112a formed thereon for engaging the teeth of a transmission gear 114. The gear 114 is mounted for rotation about a common vertical axis with a film winding gear 116. A ratchet wheel 118 is positioned adjacent to the transmission gear 114. A locking pawl 120, connected to a stroke lever 122, is urged against the teeth of the ratchet wheel 118. A film sprocket opening engaging finger 124 is operatively connected to the stroke lever 122 for advancing each frame of a film cartridge.

The support frame 14 further is formed with viewfinder lens receiving portion 130 having an opening 132 at the forward end thereof and an opening 134 at the rear end thereof. The inner surfaces of the sidewalls of the portion 130 are channelled inwardly of, and adjacent to, the opening 132 to enable a viewfinder lens 140 to be detachably supported on the support frame 14.

As stated, the support frame 14 is formed in a manner to enable a complete electronic flash light assembly to be mounted on it. Thus, as shown in FIGS. 4, 5, 7 and 9, the frame 14 is provided with a space 150 for accommodating batteries 152—152, and a compartment 154 for receiving a capacitor 156. A reflector 158, in which an electronic flash tube 160 is positioned, is also provided. An electronic indicator 162, which is visible through the window 58 in the top wall 12b of the main housing 12 when the support frame 14 is secured therein, is positioned above and to the rear of the reflector 158. The indicator 162 enables a user to determine the number of charges remaining in the capacitor 156. A switch 166, actuated by the control knob 50, is located between the compartment 154 for the capacitor 156 and a circuit board 168 for the electronic flash light assembly. The switch 166, as best shown in FIG. 7 of the drawings, comprises two pairs of metal contact strips 166a—166a, which are anchored in a non-conducting block member 170. The pairs of metal contact strips carry contacts 166b—166b which are positioned in opposed relation to one another. The lower end 50d of the control knob 50 is provided with flattened surfaces 50e—50e which are in parallel relation to the metal contact strips 166a—166a when the control knob 50 is in its "off" position. Turning of the knob 50 through an approximate 90° angle to its "on" position acts to close the pairs of contacts 166b—166b.

The closure or cover 16 for the rear of the main housing 12 is formed with clear areas to provide a viewfinder window 180 and film indicator window 182. The cover 16 has an annular skirt portion 16a having a peripheral groove or recess 184 formed therein for receiving an "O" ring 186 which provides a watertight and dustproof seal between the cover 16 and the main housing 12. Joined to each end of the cover 16 is a locking projection or ear 16b. Each ear 16b is adapted to be engaged by the U-shaped locking member 68 of the locking devices 60—60 positioned on the end walls 12d and 12e of the main housing 12. Two pairs of film engaging springs 192—192 are secured in spaced apart relation on the inner surface of the cover 16 on opposite ends of the film indicating window 182.

The dimensions and configuration of the support frame 14, and the various components mounted on it, are such that the frame 14 can be easily and readily inserted into the compartment 18 defined by the main housing 12. In assembling the camera, it is preferable that the shaft of the shutter release control button 40 and the electronic flash light knob 50 are first positioned in their respective bores 32a and 34a, and spring clips 44 and 54 are secured in place thereon. The shaft of the film advancing control arm 74, similarly, is positioned in the channel 78 formed in the housing 12. To enable the support frame 14 to be positioned in the compartment whereby the lower end 40c of the control button 40 will abut the plunger 86, and the lower end 50d of the control knob 50 will be positioned between the metal contact strips 166a—166a, openings 200 and 202, respectively, are provided in the front wall 14a of the support frame 14. Also, to enable the support frame 14 to clear the shaft 74b of the film advancing control arm 74, a clearance space 204 (see FIG. 5) is formed on the underside of the support frame 14. When the support frame 14 is in position in the main housing 12, it is secured to the main housing 12 by means of the screws 98—98. The assembly of the camera is completed by placing the cover 16 on the back of the main housing 12, engaging each locking spring 68 on the outside surface of the locking tabs 16b—16b, and moving the lever 62 forwardly and against the end walls 12d and 12e of the main housing. To remove the cover 16, it is merely necessary to raise leg 62a of the lever 62. This will urge the leg 62b against its associated tab 16b thereby disengaging the cover 16 from the main housing 12.

While for purposes of illustration, a preferred embodiment of the invention has been shown and described, it should be understood that various modifications can be made therein without departing from the spirit and scope of the invention. Thus, for example, the objective lens of the camera may be formed integrally with the main housing thereby eliminating the objective lens on the support frame. Also, the viewfinder lens may be formed integrally with the cover thereby eliminating the need for a detachable viewfinder lens on the support frame. The camera, furthermore, can be modified to convert it to a reflex-type camera, with the objective lens serving as a viewfinder lens as well as for admitting picture-forming light rays.

What is claimed is:

1. A camera adapted for underwater as well as above water use comprising: a camera mechanism support frame supporting camera mechanism constituting substantially all of the functional components of the camera and characterized in that by itself it is incapable of insulating the camera mechanism associated with it from contact with the elements including rain and dust and including a film unit-receiving portion for receiving a film unit in operative picture-taking position without opening of any closure means thereof; and a housing comprising a housing body having opening-forming portions which provides an entry for the insertion of said support frame into a compartment defined by the housing body and the passage of said film unit into said operative position in said support frame without removal of the support frame from said housing body, said housing body having a front wall portion forming transparent objective and viewfinder window means for admitting picture forming and viewfinder light rays for exposing film carried by the camera mechanism support frame and for enabling a user to view a scene to be photographed by the camera, and removable closure means for the opening-forming portions in the housing body for enabling film to be inserted into and removed from the support frame while the support frame is positioned in the compartment defined by the housing body, said closure means being provided with sealing means for enabling the closure means to be engaged in watertight and dustproof locked relationship with the main housing body, and said housing further having opening forming portion through which operating controls extend in watertight operation between the exterior of the camera housing to said camera mechanism on the support frame for operating the same.

2. The camera of claim 1, wherein said opening-forming portions of the housing body form a single opening for passage of said support frame and film unit.

3. The camera of claim 1 wherein said opening forming portions of the housing receive in watertight relation the housing shutter release control means, electronic flash light control means and film advancing control means operable externally of the housing, said housing further including shutter release means, an electronic flash unit, electronic flash element energizing means, and film advancing means, said support frame further having clearances or openings formed therein to enable the shutter release control means, the electronic flash light control means and the film advancing control means supported on the housing to be brought into operative relation with respect to the shutter release means, the electronic flash light energizing means and the film advancing means mounted on the support frame when the support frame is positioned in the housing, while enabling a watertight and dustproof seal to be maintained between said control means and the housing.

4. A camera according to claim 1 wherein the wall of the housing body at the light-transmitting objective window means therof is formed to receive detachable close-up lens means.

5. A camera according to claim 1 wherein the housing body is formed throughout of originally transparent synthetic plastic material having selected areas thereof transparent opposite said window means while most areas thereof are made opaque or non-light transmitting.

6. A camera according to claim 1 wherein the film advancing control means includes manually operable handle means which is movable with relation to the housing from a retracted, non-operable position to an extended, operable position.

7. A camera according to claim 3 wherein the film advancing control means includes a movable film advancing arm carried on the support frame, said arm being in engagement with the handle means.

8. A camera according to claim 7 wherein the movable film advancing arm is provided with gear train actuating means for effecting a film winding operation when the handle means is moved between its retracted and extended positions.

9. A camera according to claim 3 wherein the housing is further provided with transparent window means for enabling a user to view electronic flash element indicator means carried on the support frame.

10. A camera according to claim 3 wherein the support frame is formed in one-piece from a synthetic plastic material.

11. A camera according to claim 3 wherein the support frame is formed with an opening adapted to receive a separable viewfinder lens.

12. A pocket-sized camera adapted for underwater as well as above water use comprising: a camera mechanism support frame supporting camera mechanism constituting substantially all of the functional components of the camera and characterized in that by itself it is incapable of insulating the camera mechanism associated with it from contact with the elements including water and including a film unit-receiving portion for receiving a film unit in operative picture-taking position without opening of any closure means thereon and being further characterized in that the external dimensions thereof are such as to impart to it a vertically thin configuration enabling it to fit into an ordinary shirt pocket, and a housing comprising a housing body having an opening in the rear thereof which provides an entry for the insertion of said support frame into a compartment defined by the main housing body and the passage of said film unit into said operative position in said support frame without removal of the support frame from said housing, said housing body having a front wall portion forming transparent objective and viewfinder window means for admitting picture forming and viewfinder light rays for exposing film carried by the camera mechanism support frame and for enabling a user to view a scene to be photographed by the camera, and removable closure means for the opening in the rear of the housing body, said closure means being provided with sealing means for enabling the closure means to be engaged in watertight and dustproof locked relationship with the housing body at the rear thereof, and said housing further having opening forming portion through which operating controls extend in watertight relation between the exterior of the camera housing to said camera mechanism on the support frame for operating the same.

13. In a camera adapted for underwater as well as above water use comprising: a housing formed of a water-impermeable material and having openings formed therein supporting in watertight relation with the housing shutter release control means, and film advancing control means operable externally of the housing, said housing further having support frame-receiving and film-receiving opening forming portions and transparent objective and viewfinder window means forming portions for admitting picture forming and viewfinder light rays into the housing, a camera mechanism support frame adapted to be inserted into and encased in the housing, said support frame having mounted thereon substantially all of the functional components of the camera mechanism including shutter release means, film-receiving means and film advancing means, said support frame further having clearances or openings formed therein to enable the film shutter release control means and the film advancing control means supported on the housing to be brought into operative relation with respect to the shutter release means and the film advancing means mounted on the support frame when the support frame is positioned in the housing, while enabling a watertight and dustproof seal to be maintained between said control means and the housing, the improvement where the film advancing control means includes manually operable handle means which is movable with relation to the housing from a retracted, non-operable position to an extended, operable position, and wherein the handle means comprises an elongated shaft portion which is slidably engaged in watertight and dustproof relation with guide means in the housing, and a handle portion adapted to be received in an opening in the housing when the handle means is in its retracted position.

* * * * *